(12) United States Patent
Beller et al.

(10) Patent No.: US 11,068,654 B2
(45) Date of Patent: Jul. 20, 2021

(54) COGNITIVE SYSTEM FOR DECLARATIVE TONE MODIFICATION

(71) Applicant: International Business Machines Corporation, Armonk, NY (US)

(72) Inventors: Charles E. Beller, Baltimore, MD (US); Alexander Charles Tonetti, Washington, DC (US); Edward G. Katz, Washington, DC (US); John Riendeau, Madison, WI (US); Sean Thomas Thatcher, Stone Ridge, VA (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 16/192,397

(22) Filed: Nov. 15, 2018

(65) Prior Publication Data

US 2020/0159825 A1 May 21, 2020

(51) Int. Cl.
*G06F 40/30* (2020.01)
*G06F 40/284* (2020.01)
*G06Q 10/10* (2012.01)
*G06F 40/247* (2020.01)
*G06F 40/295* (2020.01)

(52) U.S. Cl.
CPC .......... *G06F 40/284* (2020.01); *G06F 40/247* (2020.01); *G06F 40/295* (2020.01); *G06Q 10/107* (2013.01)

(58) Field of Classification Search
CPC .............. G06F 17/274; G06F 17/2785; G06F 2203/011
See application file for complete search history.

(56) References Cited

U.S. PATENT DOCUMENTS

| 9,715,494 | B1 | 7/2017 | Budinsky et al. | |
| 2005/0075880 | A1 | 4/2005 | Pickover et al. | |
| 2008/0269958 | A1* | 10/2008 | Filev | B60W 50/10 701/1 |
| 2012/0245924 | A1* | 9/2012 | Brun | G06F 40/258 704/9 |
| 2014/0088944 | A1* | 3/2014 | Natarajan | G06F 30/20 703/13 |

(Continued)

OTHER PUBLICATIONS

Yegulalp, "IBM debuts first Watson machine-learning APIs," InfoWorld, Oct. 2014, 9 pages.

(Continued)

*Primary Examiner* — Jakieda R Jackson
(74) *Attorney, Agent, or Firm* — VanLeeuwen & VanLeeuwen; David K. Mattheis

(57) ABSTRACT

An approach is provided in which an information handling system analyzes a message tone vector corresponding to a message against a target tone vector corresponding to a recipient of the message. The message tone vector includes a set of message tone attributes and the target tone vector includes a set of target tone thresholds. The information handling system, in response to determining a difference between the message tone vector and the target tone vector, creates a variant message by substituting words in the message with one or more similar words based on the target tone vector. In turn, the information handling system sends the variant message to the recipient.

18 Claims, 7 Drawing Sheets

(56) References Cited

U.S. PATENT DOCUMENTS

| | | | | |
|---|---|---|---|---|
| 2016/0294746 | A1* | 10/2016 | Boothroyd | H04W 4/21 |
| 2016/0314200 | A1* | 10/2016 | Markman | G06F 16/287 |
| 2017/0109340 | A1 | 4/2017 | Chen et al. | |
| 2017/0185590 | A1 | 6/2017 | Tetreault et al. | |
| 2017/0185591 | A1 | 6/2017 | Tetreault et al. | |
| 2017/0322923 | A1 | 11/2017 | Dixon et al. | |
| 2017/0339082 | A1 | 11/2017 | Pinel et al. | |
| 2020/0004820 | A1* | 1/2020 | Chhaya | G06F 40/30 |
| 2020/0090067 | A1* | 3/2020 | Anders | G06K 9/00335 |

OTHER PUBLICATIONS

"IBM Watson Message Resonance," ProgrammableWeb, Feb. 2015, 7 pages.

* cited by examiner

COGNITIVE SYSTEM FOR DECLARATIVE TONE MODIFICATION

BACKGROUND

A user's message tone usually refers to how a user uses certain words in a specific way to convey the user's attitude and non-verbal observations about specific subjects. The user's tone is conveyed through word choice, syntax, punctuation, letter case, sentence length, etc.

In today's global business environment where electronic messages (email, texts, etc.) are becoming the default communication mechanism over face-to-face conversations, a proper message tone is imperative because a recipient of the message is not able to cue off of the user's non-verbal information to receive the user's intended tone, such as the user's facial expression, body posture, gestures, and voice tone.

Without these important non-verbal cues, a message recipient is required to interpret the message tone based on the message text, especially if the message text is ambiguous. Unfortunately, message recipients typically interpret message tones in a negative light, which can lead to misunderstandings and poor business decisions.

BRIEF SUMMARY

According to one embodiment of the present disclosure, an approach is provided in which an information handling system analyzes a message tone vector corresponding to a message against a target tone vector corresponding to a recipient of the message. The message tone vector includes a set of message tone attributes and the target tone vector includes a set of target tone thresholds. The information handling system, in response to determining a difference between the message tone vector and the target tone vector, creates a variant message by substituting words in the message with one or more similar words based on the target tone vector. In turn, the information handling system sends the variant message to the recipient.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
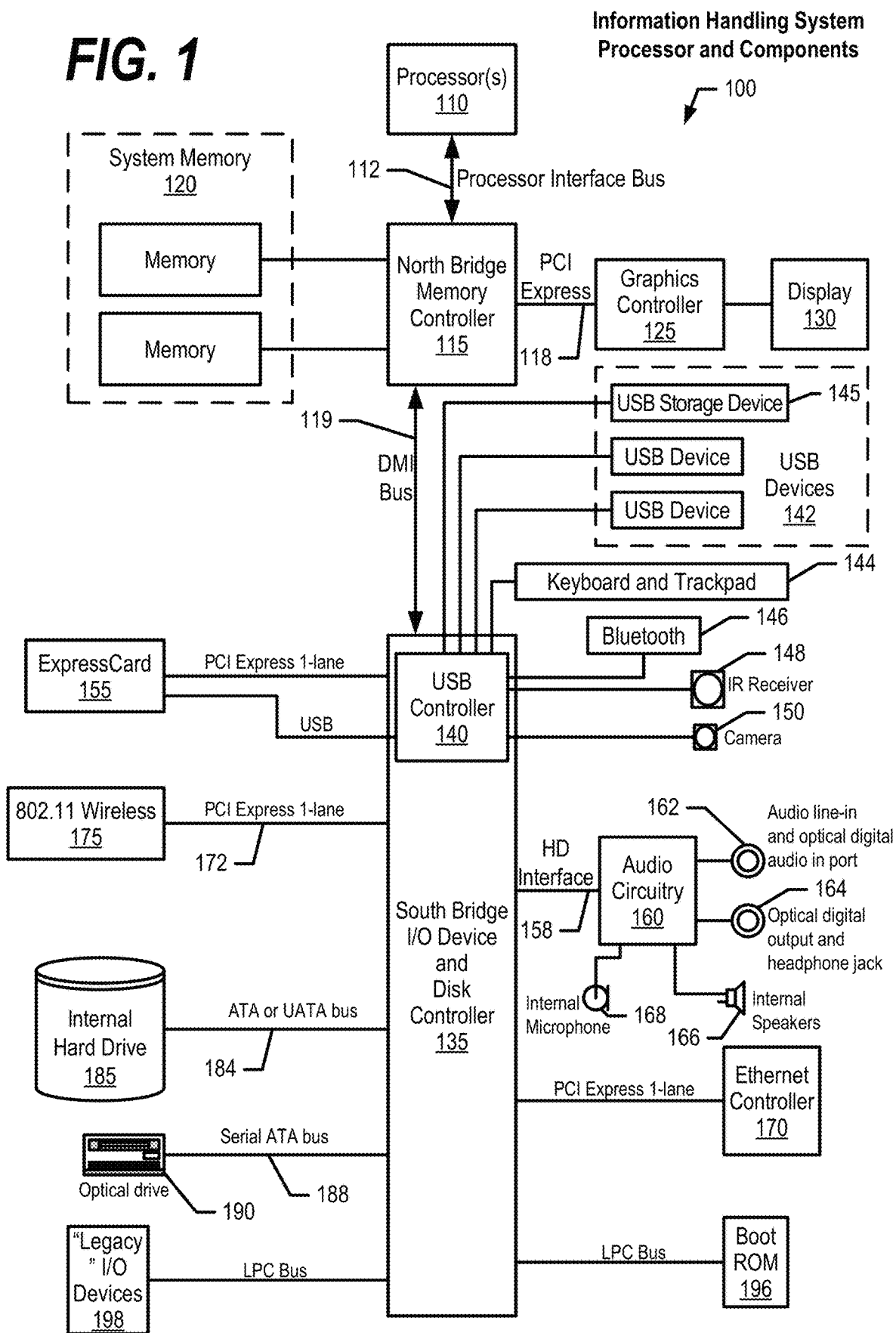
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
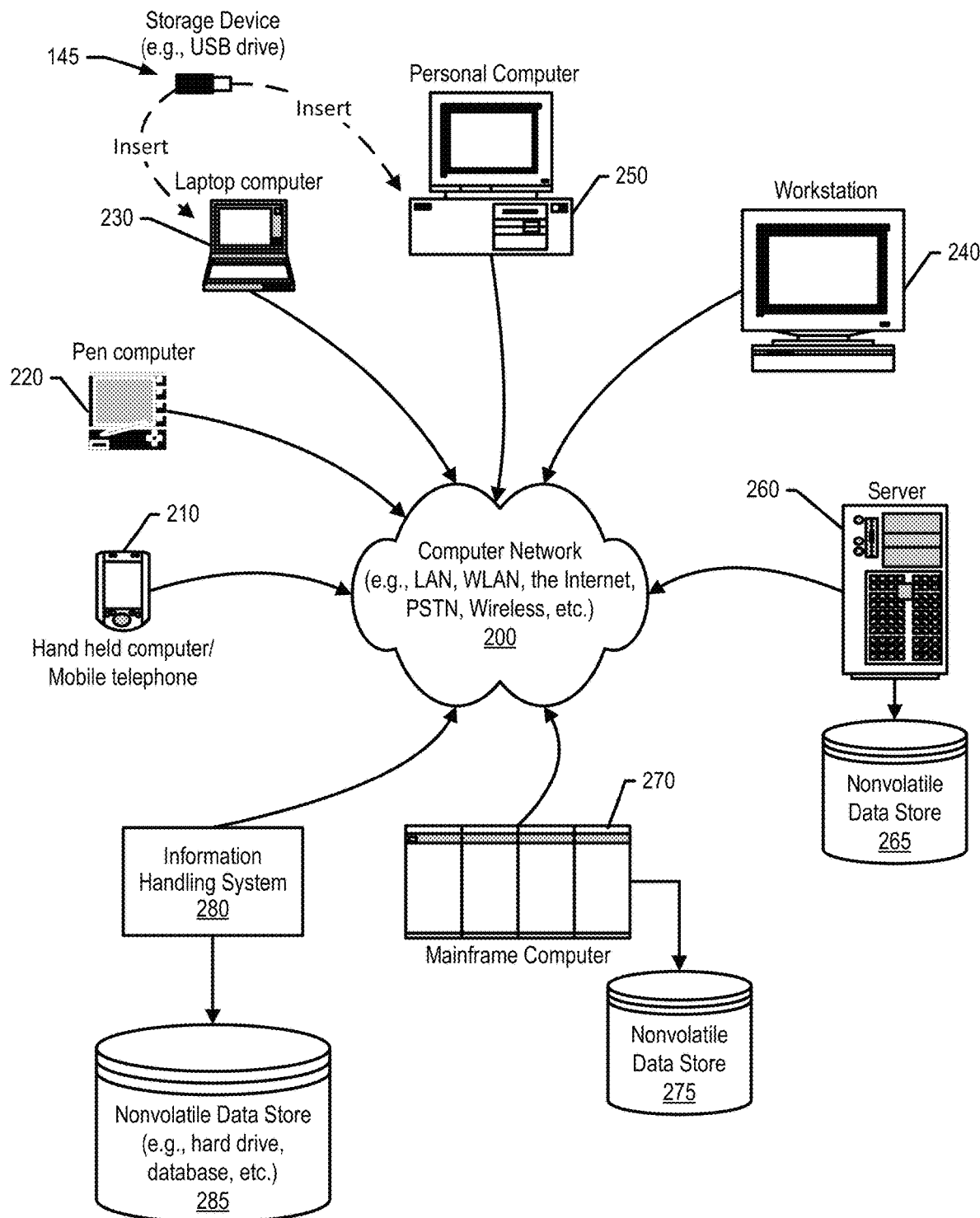
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, message tone is an important element in business communication and many times a message recipient does not properly interpret the message. For example, a user may be excited for a recipient and type the "I can't believe you did that" but the recipient interprets the message as the user being angry. FIGS. 3 through 8 disclose an approach implemented by an information handling system that automatically tunes the tone of a message based on the intended recipient of the message. The information handling system receives a message (e.g. email to a boss or client) and identifies a target tone vector in a multi-dimensional tone space corresponding to the message recipient. The information handling system automatically generates suggested variants of the message that matches the target tone vector while preserving the meaning of the message.

Figure 3:
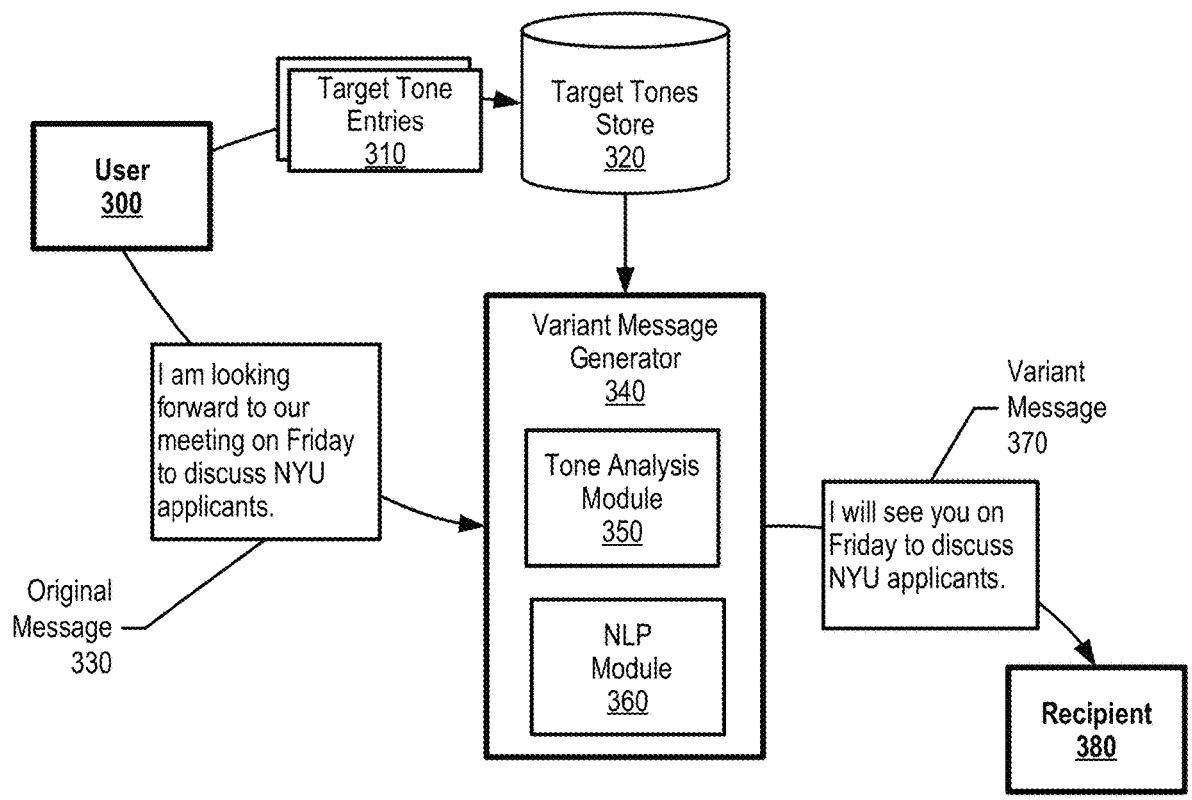
FIG. 3 is an exemplary high level diagram showing a variant message generator intercepting a message and creating a variant message based on a target tone vector corresponding to the message recipient.

FIG. 3 is an exemplary high level diagram showing a variant message generator intercepting a message and creating a variant message based on a target tone vector corresponding to the message recipient. Variant message generator 340 intercepts original messages 330 from user 300 and modifies the messages when needed to convey a proper tone for recipient 380 based on target tone vectors stored in target tones store 320.

During the configuration process of variant message generator 340, user 300 generates target tone entries 310 to correspond with common recipients of user 300's messages, such as "co-worker," "boss," "spouse," etc. Target tone entries 310 are stored in target tones store 320 as target tone vectors (see FIG. 4 and corresponding text for further details). In one embodiment, user 300 generates generic target tone entry 310 for other recipients that are not part of user 300's common recipients. In one embodiment, user 300 uses user interface 400 shown in FIG. 4 to create target tone entries that includes multiple target tone thresholds for multiple target tone attributes.

When variant message generator 340 receives original message 330, variant message generator 340 identifies the message recipient (recipient 380) and searches target tones store 320 for a target tone vector that matches the recipient. Variant message generator 340 then uses tone analysis module 350 to identify the message tone attributes/values of original message 330 and, in one embodiment, form the message tone attribute values into a message tone vector.

Figure 5:
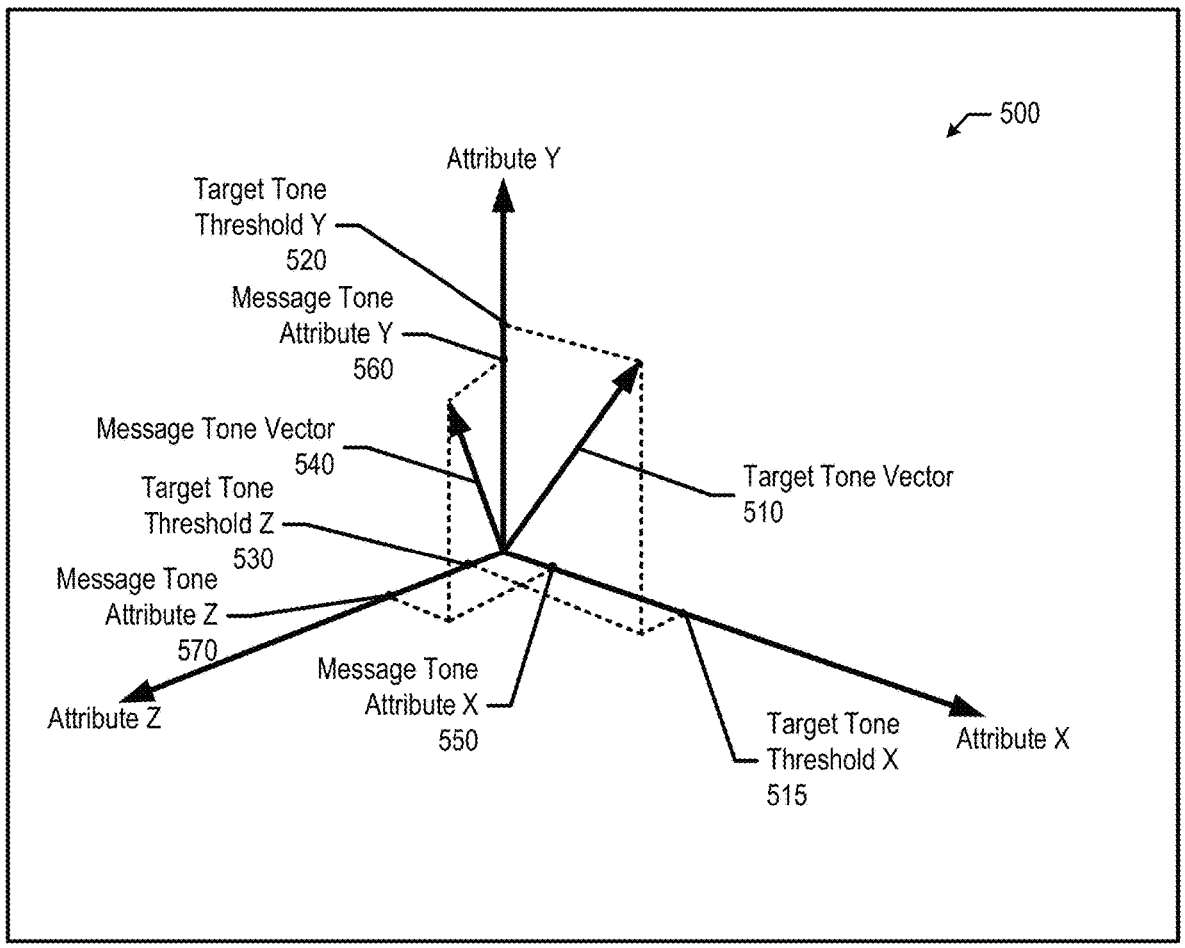
FIG. 5 is an exemplary diagram depicting a message tone vector and a target tone vector.

Then, variant message generator 340 compares the message tone vector against the target tone vector to determine if original message 330 matches the target tone intended for recipient 380 (see FIG. 5 and corresponding text for further details). When the message tone vector attributes do not match the target tone vector thresholds, variant message generator 340 uses natural language processing (NLP) module 360 to identify lexical terms and named entities on original message 330. Variant message generator 340 then retrieves synonyms of lexical terms from, in one embodiment, a synonym service, and retrieves variant names of entity names from, in one embodiment, a named entity recognition (NER) service.

Variant message generator 340 then creates a prioritized list of target substitutions based on the synonyms and variant names and uses the target substitutions to create candidate variant messages. Variant message generator 340 compares the message tones of the candidate variant messages against the target tone vector to identify those candidate messages that meet the target tone vector's thresholds.

In one embodiment, the process generate variants based on incrementally substituting out lexical terms and the variant names: For example, referring to original message 330, substituting in "looking forward to" with a near-synonym "anticipating", the process generates "I am anticipating our meeting on Friday to discuss the NYU applicants." This variant message generates message tone vector attribute values of "Joy 0.28; Anger 0.10; Disgust 0.02; Sadness 0.15; Fear 0.08." Further substituting NYU with "New York University" yields a variant message of "I am anticipating our meeting on Friday to discuss the New York University applicants." This variant message generates message tone vector attribute values of "Joy 0.48; Anger 0.09; Disgust 0.01; Sadness 0.21; Fear 0.08."

In one embodiment, variant message generator 340 passes a highest scoring candidate variant message to user 300 for approval. If user 300 does not approve the first candidate variant message, variant message generator 340 sends the next highest scoring candidate variant message to user 300 to approve (see FIG. 7 and corresponding text for further details). Once one of the candidate variant messages is approved, variant message generator 340 sends variant message 370 to recipient 380.

In one embodiment, if a message includes multiple recipients corresponding to different target tone vectors, variant message generator 340 iterates the process and sends different variants of the message to different recipients. In and embodiment where a single message is required to satisfy multiple target tones, variant message generator 340 selects from one or more of the following options: (i) Generate an intermediate target tone by taking an average of the multiple target tones and proceed using the intermediate tone as the target tone; (ii) Specify a hierarchy of recipients in the profile, and select the target tone corresponding to the highest rank recipient; and (iii) Identify the target tone conflicts and allow the user a chance to explicitly select a stored target tone or generate and save a new target tone.

Figure 4:
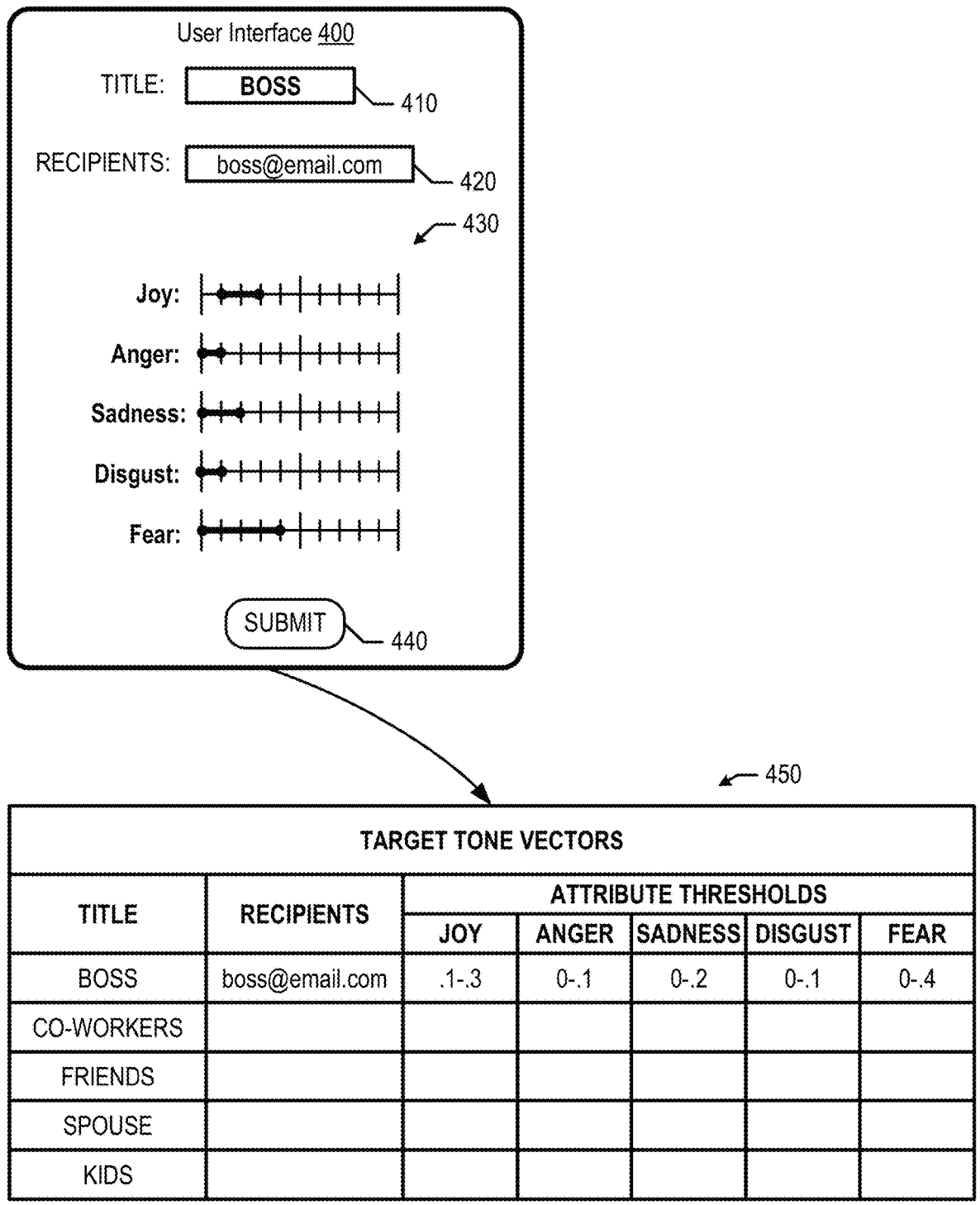
FIG. 4 is an exemplary diagram depicting a user interface utilized by a user to generate target tone vectors that include a target recipient and attribute threshold ranges.

FIG. 4 is an exemplary diagram depicting a user interface utilized by a user to generate target tone vectors that include a target recipient and attribute threshold ranges. User 300 utilizes user interface 400 to create a target tone vector for user 300's boss. User 300 enters a title in box 410 and the boss's email address, mobile phone number, etc. in box 420 (target recipient identifier, also referred to herein as target recipient).

Next, user 300 adjusts thresholds of each target tone attribute 430 until user 300 is satisfied with the entry, at which point user 300 selects submit button 440. In one embodiment, user interface 400 has includes an "EXAMPLE" button that user 300 selects to see an example of a message with the selected target tone thresholds.

The target tone thresholds are stored as a multidimensional target tone vector in in target tone vectors 450. Each target tone vector includes the title, recipient addresses, and thresholds for each attribute. In turn, variant message generator 340 matches recipients of incoming messages to target tone vectors 450 and uses the matched target tone vector to determine whether the message adheres to the target tone for the recipient.

FIG. 5 is an exemplary diagram depicting a message tone vector and a target tone vector. Graph 500 shows a comparison of target tone vector 510 and message tone vector 540. Each vector is multidimensional and, in one embodiment, includes more dimensions than the three dimensions shown in FIG. 5.

Message tone vector 540 includes message tone attribute values X 550, Y 560, and Z 570. Target tone vector 510 includes thresholds X 515, Y 520, and Z 530 that, in one embodiment, include a minimum value and a maximum value. Variant message generator 340 evaluates the message tone attribute values of message tone vector 540 against the target tone thresholds of target tone vector 510 on an attribute-by-attribute basis. Specifically, variant message generator 340 compares message tone attribute value X 550 against target tone threshold X 515, compares message tone attribute value Y 560 against target tone threshold Y 520, and compares message tone attribute value Z 570 against target tone threshold Z 530.

Figure 7:
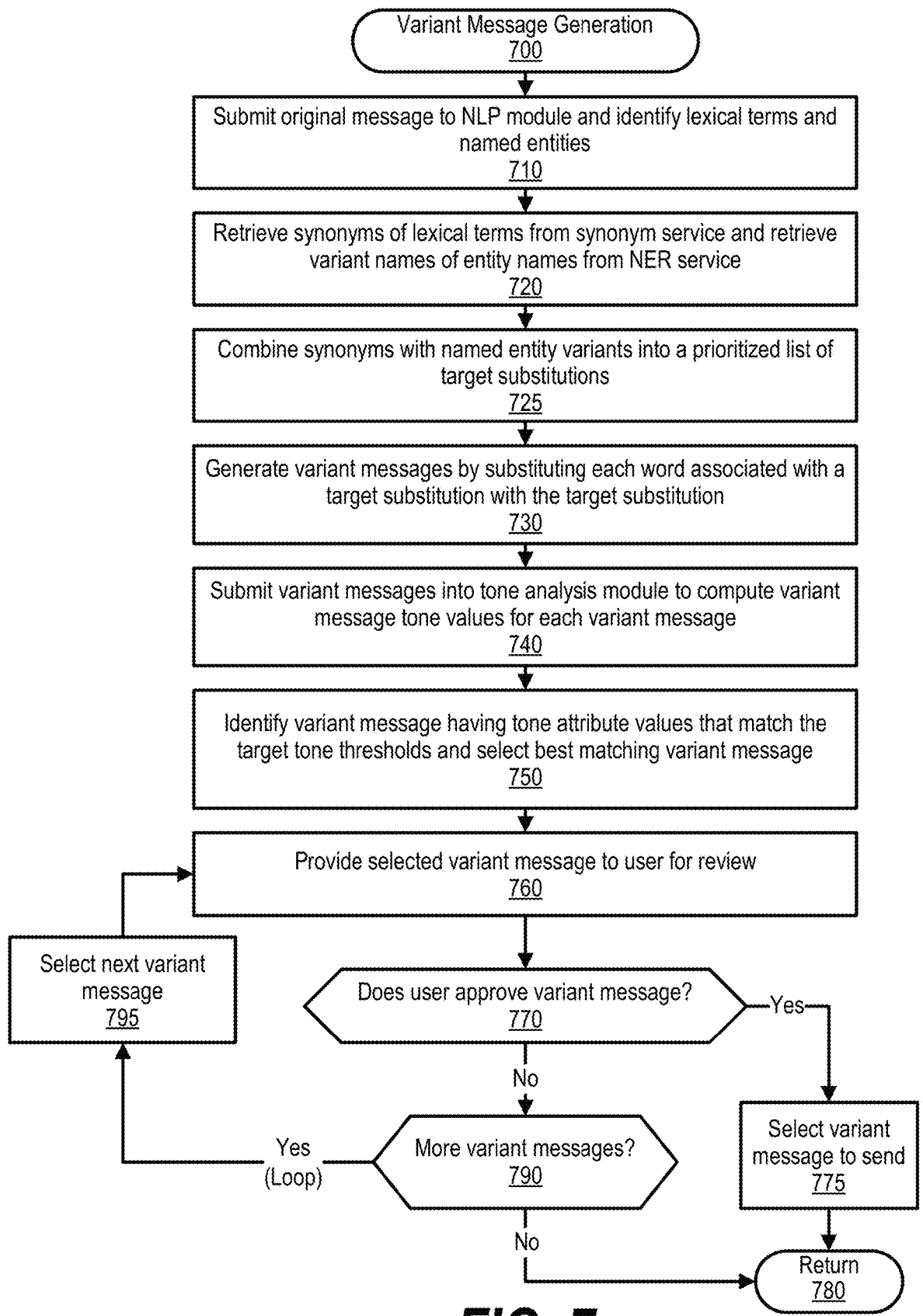
FIG. 7 is an exemplary flowchart showing steps taken to generate variant messages based on target tone thresholds.

When one or more message tone attributes fail to meet their corresponding target tone threshold, variant message generator 340 proceeds through a series of steps to generate variant messages that have message tone attributes that are in line with target tone vector 510 (see FIG. 7 and corresponding text for further details).

Figure 6:
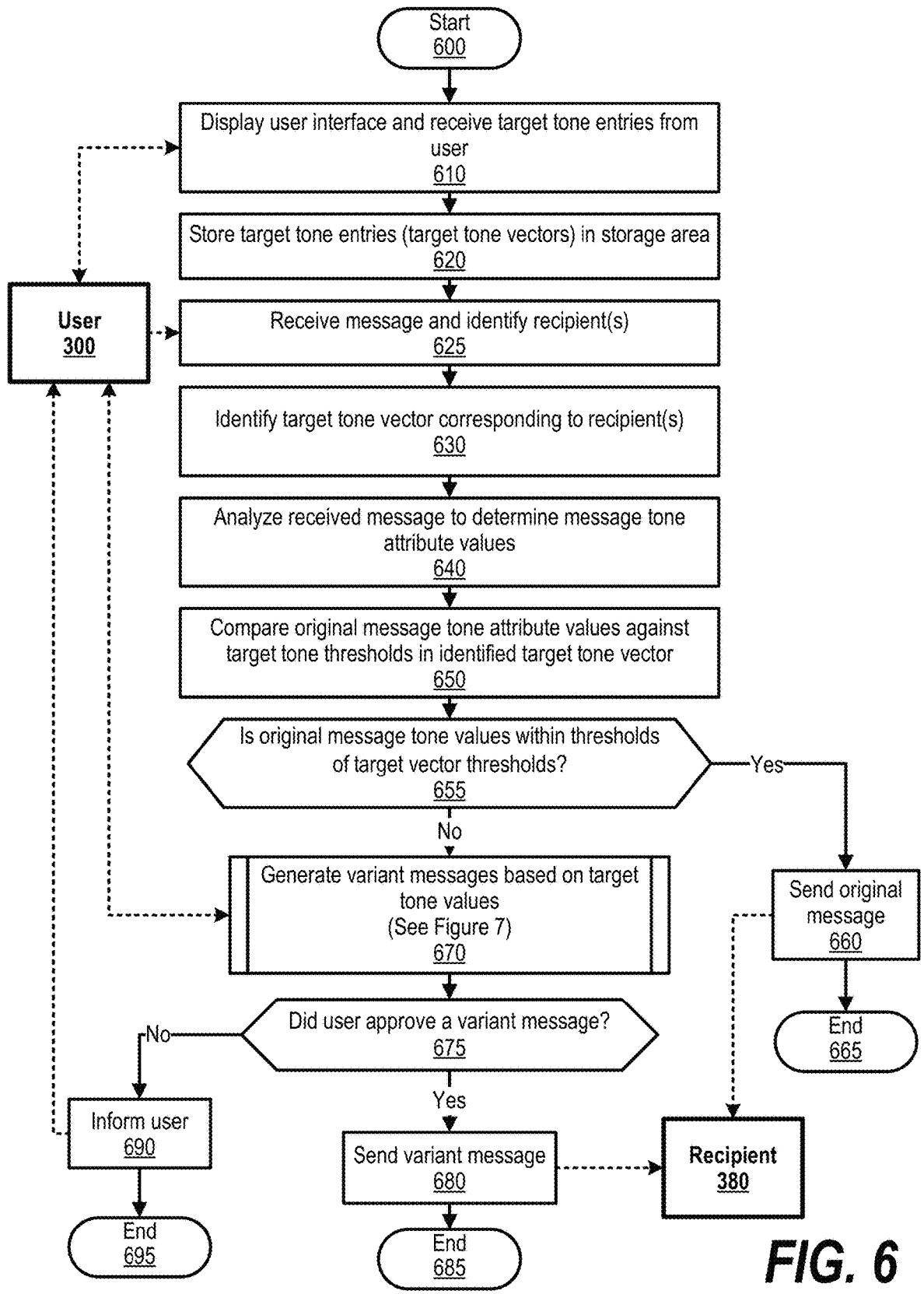
FIG. 6 is an exemplary flowchart showing steps taken to analyze a user message and generate a variant message if required to send to a recipient.

FIG. 6 is an exemplary flowchart showing steps taken to analyze a user message and generate a variant message if required to send to a recipient. FIG. 6 processing commences at 600 whereupon, at step 610, the process displays a user interface (user interface 400) and receives target tone entries from the user. At step 620, the process stores the target tone entries as target tone vectors in target tones store 320 (see FIG. 4 and corresponding text for further details).

At step 625, the process receives a message and identifies a recipient, such as the user's boss, friend, co-worker, etc. At step 630, the process identifies a target tone vector corresponding to the recipient and retrieves its corresponding target tone thresholds, such as "Joy: 0.1-0.3; Disgust: 0.0-0.1; Anger: 0.0-0.2; Sadness: 0.0-0.2; Fear: 0.0-0.4."

At step 640, the process uses tone analysis module 350 to determine the message tone attribute values and forms into a message tone vector (e.g., sadness, joy, anger, etc.). For example, the message tone vector may have message tone attribute values of "Joy: 0.57, Anger: 0.05, Disgust: 0.00, Sadness: 0.12, Fear: 0.04." In one embodiment, the process submits the message to a tone analysis service through an API. At step 650, the process compares the message tone values against the identified target tone thresholds from step 630 (see FIG. 5 and corresponding text for further details).

The process determines as to whether the original message's tone attribute values are within the target tone vector thresholds (decision 655). If the original message tone values are within the thresholds of the target tone vector, then decision 655 branches to the 'yes' branch. At step 660, the process sends the original message to recipient 380 and FIG. 6 processing thereafter ends at 665.

On the other hand, if the original message tone attribute values are not within the target tone thresholds of the target tone vector, then decision 655 branches to the 'no' branch. At predefined process 670, the process generates variant messages to align the message tone to the target tone (see FIG. 7 and corresponding text for processing details).

The process determines as to whether the user approved one of the message generated in step 670 (decision 675). If the user approved one of the variant messages, then decision 675 branches to the 'yes' branch whereupon, at step 680, the process sends the variant message to recipient 380. FIG. 6 processing thereafter ends at 685. On the other hand, if the user did not approve one of the variant messages, then decision 675 branches to the 'no' branch whereupon, at step 690, the process informs user 300 and FIG. 6 processing thereafter ends at 695.

FIG. 7 is an exemplary flowchart showing steps taken to generate variant messages based on target tone thresholds. FIG. 7 processing commences at 700 whereupon, at step 710, the process submits the original message to natural language processing (NLP) module 360 and identifies lexical terms and named entities. At step 720, the process retrieves synonyms of lexical terms from, in one embodiment, a synonym service and retrieves variant names of entity names from, in one embodiment, a named entity recognition (NER) service.

At step 725, the process combines the synonyms with the named entity variants into a prioritized list of target substitutions. In one embodiment, the process prioritizes potential target substitutions based on the distance between the message tone attribute value of a lexical item or entity and the corresponding target tone threshold. Larger distances have higher priority as they have the potential to most quickly move the utterance tone vector towards the target tone vector. As an example, the process receives vectors associated with individual lexical terms by submitting the lexical terms individually to tone analysis module 350 or a service. The vectors corresponding to each lexical item are then compared to the target tone and a distance is calculated (e.g. an inverse cosine similarity). The distances are then used in the prioritization so the most distance lexical item is the first to go through the synonym substitution process At step 730, the process generates variant messages, in one embodiment, by substituting each word associated with a target substitution with the target substitution. For example, when the prioritized list includes five entries, the process generates at least five variant messages by individually substituting the substitutions and generating five separate variant messages. In one embodiment, some lexical items or entities have more than one candidate substitution provided by a synonym service in which case the number of variant messages is higher. For example, if the lexical item "looking forward to" corresponds to three synonyms, the process generates three variants in order to identify a replacement for that lexical item, and then the process generates variants corresponding to the other four entries in the prioritized list.

At step 740, the process submits the variant messages into tone analysis module 350 to compute variant message tone values for each variant message. In one embodiment, the process substitutes the highest target substitution entry (step 730) and runs the variant message through tone analysis module 350 (step 740) to determine whether it meets the target tone thresholds. If not, the process adds the second substitution to the variant message and iteratively modifies the variant message until the variant message meets the target tone thresholds.

At step 750, the process selects variant messages having message tone attribute values that are within the target tone thresholds and selects the best matching variant message. At step 760, the process provides the selected variant message to user 300 for review.

The process determines as to whether the user approved the variant message (decision 770). If the user approves variant message, then decision 770 branches to the 'yes' branch. At step 775, the process selects the variant message to send and FIG. 7 processing thereafter returns to the calling routine (see FIG. 6) at 780.

On the other hand, if the user does not approve the variant message, then decision 770 branches to the 'no' branch whereupon the process determines as to whether there are more variant messages that meet the target tone thresholds (decision 790). If there are more variant messages, then decision 790 branches to the 'yes' branch which loops back to select the next highest ranking variant message and provide the selected variant message to user 300. This looping continues until there are no more variant messages that meet the target tone thresholds, at which point decision 790 branches to the 'no' branch exiting the loop and processing thereafter returns to the calling routine (see FIG. 6) at 780.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a non-volatile data store and a processor, the method comprising:

creating a plurality of target tone vectors that correspond to a plurality of message recipients;
storing the plurality of target tone vectors in the non-volatile data store;
receiving a message initiated by a user and targeted to one of the plurality of message recipients;
selecting, from the non-volatile data store by the processor, one of the plurality of target tone vectors that corresponds to the targeted message recipient, wherein the selected target tone vector comprises a plurality of target tone thresholds;
generating, by a tone analysis module, a message tone vector from the message, wherein the message tone vector comprises a plurality of numerical message tone attribute values;
analyzing the plurality of target tone thresholds against the plurality of numerical message tone attribute values;
identifying at least one of the plurality of numerical message tone attribute values that fails to meet its corresponding one of the plurality of target tone thresholds;
automatically tuning, by the processor, a tone of the message based on the targeted message recipient in response to identifying the at least numerical message tone attribute value failing to meet its corresponding one of the plurality of target tone thresholds, wherein the automatic tuning further comprises:
  automatically creating a variant message based on the identified at least one numerical message tone attribute value by substituting one or more words in the message with one or more similar words corresponding to the target tone vector, wherein the variant message preserves a meaning of the message; and
sending the variant message to the recipient.

2. The method of claim 1 further comprising:
retrieving a set of synonyms corresponding to at least one lexical term included in the message;
combining the set of synonyms into a prioritized list of target substitutions;
generating a candidate message by substituting at least one of the one or more words in the message with at least one of the one or more similar words based on a first one of the target substitutions;
displaying the candidate message to the user that initiated the message; and
in response to receiving approval from the user of the candidate message, sending the candidate message as the variant message to the recipient.

3. The method of claim 2 further comprising:
in response to receiving a rejection of the candidate message from the user:
  generating a different candidate message by substituting at least one of the one or more words in the message with a different one of the one or more similar words based on a second one of the target substitutions; and
  displaying the different candidate message to the user.

4. The method of claim 2 further comprising:
retrieving a set of variant names corresponding to at least one entity name included in the message; and
combining the set of variant names with the set of synonyms into the prioritized list of target substitutions.

5. The method of claim 4 further comprising:
receiving the set of synonyms from a synonym service in response to sending the at least one lexical term to the synonym service; and
receiving the set of variant names from a named entity variant names service in response to sending the at least one entity name to a named entity variant names service.

6. The method of claim 1 wherein, prior to the analyzing, the method further comprises:
displaying a user interface to the user that comprises a plurality of target tone attribute selections;
receiving a response from the user that comprises a target recipient and the plurality of target tone thresholds corresponding to the plurality of target tone attributes; and
storing the target recipient and the plurality of target tone thresholds into the target tone vector.

7. An information handling system comprising:
one or more processors;
a non-volatile data store coupled to at least one of the processors;
a set of computer program instructions stored in the non-volatile data store and executed by at least one of the processors in order to perform actions of:
  creating a plurality of target tone vectors that correspond to a plurality of message recipients;
  storing the plurality of target tone vectors in the non-volatile data store;
  receiving a message initiated by a user and targeted to one of the plurality of message recipients;
  selecting, from the non-volatile data store by the processor, one of the plurality of target tone vectors that corresponds to the targeted message recipient, wherein the selected target tone vector comprises a plurality of target tone thresholds;
  generating, by a tone analysis module, a message tone vector from the message, wherein the message tone vector comprises a plurality of numerical message tone attribute values;
  analyzing the plurality of target tone thresholds against the plurality of numerical message tone attribute values;
  identifying at least one of the plurality of numerical message tone attribute values that fails to meet its corresponding one of the plurality of target tone thresholds;
  automatically tuning, by the processor, a tone of the message based on the targeted message recipient in response to identifying the at least numerical message tone attribute value failing to meet its corresponding one of the plurality of target tone thresholds, wherein the automatic tuning further comprises:
    automatically creating a variant message based on the identified at least one numerical message tone attribute value by substituting one or more words in the message with one or more similar words corresponding to the target tone vector, wherein the variant message preserves a meaning of the message; and
  sending the variant message to the recipient.

8. The information handling system of claim 7 wherein the processors perform additional actions comprising:
retrieving a set of synonyms corresponding to at least one lexical term included in the message;
combining the set of synonyms into a prioritized list of target substitutions;

generating a candidate message by substituting at least one of the one or more words in the message with at least one of the one or more similar words based on a first one of the target substitutions;

displaying the candidate message to the user that initiated the message; and in response to receiving approval from the user of the candidate message, sending the candidate message as the variant message to the recipient.

9. The information handling system of claim 8 wherein the processors perform additional actions comprising:

in response to receiving a rejection of the candidate message from the user:

generating a different candidate message by substituting at least one of the one or more words in the message with a different one of the one or more similar words based on a second one of the target substitutions; and displaying the different candidate message to the user.

10. The information handling system of claim 8 wherein the processors perform additional actions comprising:

retrieving a set of variant names corresponding to at least one entity name included in the message; and combining the set of variant names with the set of synonyms into the prioritized list of target substitutions.

11. The information handling system of claim 10 wherein the processors perform additional actions comprising:

receiving the set of synonyms from a synonym service in response to sending the at least one lexical term to the synonym service; and receiving the set of variant names from a named entity variant names service in response to sending the at least one entity name to a named entity variant names service.

12. The information handling system of claim 7 wherein, prior to the analyzing, the processors perform additional actions comprising:

displaying a user interface to the user that comprises a plurality of target tone attribute selections;

receiving a response from the user that comprises a target recipient and the plurality of target tone thresholds corresponding to the plurality of target tone attributes; and storing the target recipient and the plurality of target tone thresholds into the target tone vector.

13. A computer program product stored in a non-transitory computer readable storage medium, comprising computer program code that, when executed by an information handling system, causes the information handling system to perform actions comprising:

creating a plurality of target tone vectors that correspond to a plurality of message recipients;

storing the plurality of target tone vectors in the non-volatile data store;

receiving a message initiated by a user and targeted to one of the plurality of message recipients;

selecting, from the non-volatile data store by the processor, one of the plurality of target tone vectors that corresponds to the targeted message recipient, wherein the selected target tone vector comprises a plurality of target tone thresholds;

generating, by a tone analysis module, a message tone vector from the message, wherein the message tone vector comprises a plurality of numerical message tone attribute values;

analyzing the plurality of target tone thresholds against the plurality of numerical message tone attribute values;

identifying at least one of the plurality of numerical message tone attribute values that fails to meet its corresponding one of the plurality of target tone thresholds;

automatically tuning, by the processor, a tone of the message based on the targeted message recipient in response to identifying the at least numerical message tone attribute value failing to meet its corresponding one of the plurality of target tone thresholds, wherein the automatic tuning further comprises:

automatically creating a variant message based on the identified at least one numerical message tone attribute value by substituting one or more words in the message with one or more similar words corresponding to the target tone vector, wherein the variant message preserves a meaning of the message; and sending the variant message to the recipient.

14. The computer program product of claim 13 wherein the information handling system performs further actions comprising:

retrieving a set of synonyms corresponding to at least one lexical term included in the message;

combining the set of synonyms into a prioritized list of target substitutions;

generating a candidate message by substituting at least one of the one or more words in the message with at least one of the one or more similar words based on a first one of the target substitutions;

displaying the candidate message to the user that initiated the message; and in response to receiving approval from the user of the candidate message, sending the candidate message as the variant message to the recipient.

15. The computer program product of claim 14 wherein the information handling system performs further actions comprising:

in response to receiving a rejection of the candidate message from the user:

generating a different candidate message by substituting at least one of the one or more words in the message with a different one of the one or more similar words based on a second one of the target substitutions; and displaying the different candidate message to the user.

16. The computer program product of claim 14 wherein the information handling system performs further actions comprising:

retrieving a set of variant names corresponding to at least one entity name included in the message; and combining the set of variant names with the set of synonyms into the prioritized list of target substitutions.

17. The computer program product of claim 16 wherein the information handling system performs further actions comprising:

receiving the set of synonyms from a synonym service in response to sending the at least one lexical term to the synonym service; and receiving the set of variant names from a named entity variant names service in response to sending the at least one entity name to a named entity variant names service.

18. The computer program product of claim 13 wherein the information handling system performs further actions comprising:
- prior to the analyzing:
    - displaying a user interface to the user that comprises a plurality of target tone attribute selections;
    - receiving a response from the user that comprises a target recipient and the plurality of target tone thresholds corresponding to the plurality of target tone attributes; and
    - storing the target recipient and the plurality of target tone thresholds into the target tone vector.

\* \* \* \* \*